United States Patent [19]

Hait

[11] Patent Number: 5,555,126
[45] Date of Patent: Sep. 10, 1996

US005555126A

[54] DUAL PHASE AMPLIFICATION WITH PHASE LOGIC

[76] Inventor: John N. Hait, P.O. Box 4694, Missoula, Mont. 59806-4694

[21] Appl. No.: 420,195

[22] Filed: Apr. 10, 1995

[51] Int. Cl.⁶ ..................................................... G06G 7/00
[52] U.S. Cl. ........................ 359/333; 364/807; 364/713; 359/108; 359/577
[58] Field of Search ................................... 364/807, 713; 359/1, 15, 108, 577, 333

[56] References Cited

U.S. PATENT DOCUMENTS

5,093,802  3/1992  Hait ......................................... 364/807
5,293,173  3/1994  Kropielnicki et al. ................... 343/704

Primary Examiner—Mark Hellner
Attorney, Agent, or Firm—Leonard D. Schappert

[57] ABSTRACT

A means, method and apparatus for dual-phase amplification of wave-type signals is disclosed comprising superimposing a constant level beam set and a modulated beam set to produce a first interference image at first and second locations. A first image component separator separates energy from constructive and destructive interference component regions to produce secondary beam sets that are combined to produce a second interference image, which is separated at a destructive interference region to produce the output. The amplifier with multiple inputs is then connected in cascade, as a phase-bistable device, as a level detector, an AND, an OR, and/or a synchronized oscillator. Multiple frequencies work independently, allowing for frequency-multiplexed functions.

20 Claims, 6 Drawing Sheets

DUAL PHASE AMPLIFICATION WITH PHASE LOGIC

BACKGROUND OF THE INVENTION

1. TECHNICAL FIELD

The present invention relates to optical computers and optical signal processing, including signal amplification, oscillation, level detection, and the logical AND, OR, and bistable information storage functions using any wave-type energy, including electromagnetic waves, acoustical waves, and moving particles.

2. BACKGROUND ART

U.S. Pat. No. 5,093,802, by Hait, contains the primary background art for the present invention. It makes use of interference between modulated and unmodulated input beams of wave-type energy. The functions are defined in terms of constructive and destructive interference component regions at a fringe component separator, such as a mask, which is used to separate energy from at least one component region to provide at least one amplitude-modulated output.

That patent provides several logic elements, including a two-input OR and a signal amplifier, all having amplitude-modulated outputs. Absent from the prior art is an amplifier that uses multiple interference images to eliminate the constant output amplitude bias of the prior amplifier in both amplitude- and phase-modulated applications. Also absent is a dual-phase amplifier that is capable of providing phase-modulated outputs and its application in five important logic elements, namely the logical AND, a multi-input OR, a phase-bistable device, a level detector, and an oscillator, along with a means and method of producing a useful output from these functions.

The remainder of the prior art, such as U.S. Pat. No. 5,239,173 by Yang, uses "sensors" and other non-interference means in order to accomplish the AND function, whereas the present invention uses interference to accomplish that process. Yang does not provide for the other items listed above.

SUMMARY OF THE INVENTION

A means, method and apparatus for dual-phase amplification of wave-type signals is disclosed comprising superimposing a constant level beam set and a modulated beam set to produce a first interference image at first and second locations. A first image component separator separates energy from constructive and destructive interference component regions to produce intermediate beam sets that are combined to produce a second interference image, which is separated at a destructive interference region to produce the output. The amplifier is then connected in cascade, multiple inputs are added, and the amplifier is connected as a phase-bistable device, as a level detector, an AND, an OR, and/or a synchronized oscillator. Multiple frequencies work independently, allowing for frequency-multiplexed functions.

The present invention uses a double interference image and double image component separation to provide amplification, oscillation, and logic functions. Any wave-type energy that is capable of producing the required interference, including acoustical waves, moving particle waves, and electromagnetic energy, can be used in the present invention. However, in order to provide for a clear understanding, optical terminology will be used in this disclosure.

Holograms, in particular computer-generated holograms, produce interference images from many thousands of individual rays or sets of beams, even independently modulated multiple sets of beams. The interference images that result from these beam sets are composed of light areas of constructive interference (CI) and dark areas of destructive interference (DI), the exact location of which depends upon the holographic optics used and the phase and amplitude relationships between the input beam sets. The classical two-beam interference fringes, such as Young's and Michelson's, are also interference images that have shapes characteristic of the optical arrangement used in creating them, and can be viewed as subsets of the possible interference images that can be used in the present invention.

Holographic optics are among the many ways of implementing the present invention. Utilizing holographic optics, one is able to combine multiple beam sets from various inputs so as to form interference images at common locations. However, any combination of optical elements capable of producing interference as set out herein can also be used.

The simplest implementation of the dual-phase amplifier combines a power beam set and a controlling beam set to produce a first interference image. The power beam set has a substantially constant energy level, amplitude and phase. The controlling beam set is phase- and/or amplitude-modulated with information to be amplified.

Energy from two portions, one CI and one DI, of this first interference image is separated using a first image component separator to produce first and second intermediate beams sets that are recombined to produce a second interference image, a portion of which is then separated using a second image component separator to produce an amplified output.

The two portions separated from the first interference image are taken from "first" and "second" locations. This is because multiple locations having the same phase of energy, or energy that can be phase-adjusted to adopt the same phase, can be used to produce a single beam "set," which is then used to help produce the second image.

The terms "first" and "second" interference images refer to the position of images at the first and second image component separators, rather than to the distribution of energy within each image. The distribution of energy within each image changes with modulation.

The present invention produces a maximum output of a first phase when the power and controlling input beam sets are in phase, and of a second phase when they are 180 degrees out of phase. The output level is also proportional to the level of the second beam set.

In more complex applications, multiple input beam sets are provided both with and without feedback to produce specific logic and signal-processing functions. For that reason, the controlling beam set is actually a group of controlling beam sets. All of the beam sets in the controlling beam set group are superimposed at the position of the first image component separator.

The instantaneous vector sum of all of the superimposed beams that make up the controlling beam set group behaves as an energy sum which, together with the power beam set, produces the first interference image. As the energy sum changes, due to modulation of one or more of the controlling input beam sets, the distribution of energy within the first interference image changes. As a result, the intermediate beam sets change, as does the output. The energy sum is a convenient concept for determining how the output will be affected given various inputs, because the energy sum can be determined and a direct comparison made to the power beam set.

The present invention has many useful qualities that can be seen upon examination of the vector formulae, which have been derived using the most elementary arrangement where the power beam set and the energy sum each have but one beam. Multiple beam sets and groups of sets are merely multiples of the basic formulae.

If A and B superimposed inputs are of different amplitudes, the center of the CI area will have an amplitude of A+B and the center of the DI area will have an amplitude of A−B where A is the beam set which supplies power to the amplifier and B is the energy sum of the controlling beam set group which is modulated. When A>B, the output DI portion of the second image has the amplitude of (A+B)−(A−B)=2B.

To individuals familiar with the art, this calculation may seem rather academic and not especially useful. After all, 2B can be produced by simply focusing B onto a smaller spot. However, please consider the following important facts:

1. The energy which actually makes up the output value of 2B is produced from two different sources, A and B.

2. The output is proportional to the B input only.

3. If the optical arrangement is such that much of the energy from one beam is combined with the energy from the second beam, the present invention is capable of amplification from both an energy standpoint and an amplitude standpoint.

4. The output 2B does not result from simple focusing, but from combining energy from both A and B. If all of the energy of A is combined with all of the energy from B, there is a greater amount of energy available than if the amplitude of B is increased by focusing, because focusing increases the amplitude, but at the expense of cross-sectional area. Focusing does not increase the total amount of energy available, but the present invention does.

5. If beam A is held constant and B is modulated, the output is not a constant plus a modulated waveform, as in the prior art, but is a completely modulated waveform with up to twice the amount of energy of the original modulated waveform.

6. Utilizing this amplifier, a number of photonic logic arrangements can be made including a phase-bistable device, an oscillator, and a level detector. The level detector can be used to make a logical OR and/or a logical AND.

7. Because the energy in the output comes partially from a source that is on all the time, a feedback of some of the output can be used to maintain the first image even after the B input has been shut off, a feat impossible with simple focusing.

8. When A=B, the second interference image goes away, and when B goes to zero, the first interference image goes away, so that as B is modulated, it is as if the interference was switching from the first image to the second image and back.

9. When B is phase-modulated, the two locations where CI and DI occur in the first image switch positions so that the phase of the output will be one of two phases depending on the phase of input B. It is as if the image were moving back and forth between the two openings in the first image component separator.

10. When inputs A and B are neither in phase nor 180 degrees out of phase, the first image component separator stops much of the energy because CI will occur in between the two openings. As a result, the output will be at a maximum only when the B input is either in phase or 180 degrees out of phase with the A input. Therefore, the present invention favors one of two phases.

11. When the B input is phase-modulated by 180 degrees, the formula becomes (A−B)−(A+B)=−2B, the minus sign indicating that the output has a phase opposite that of the 2B amplitude described above.

12. When B>A, the CI area of the first interference image is still (A+B). However, the phase in the DI area of that first interference image changes to that of −(A−B)=(B−A). Because of this phase change, the former DI area at the third location in the second interference image now becomes a CI area. As a result, the output would appear to become (A+B)+(B−A)=2B. However, this formula represents amplitude only, and not total energy. While certain optical arrangements are able to increase the focusing effect due to the increase in B beyond the level of A, with corresponding increases in amplitude, further increases in B will not increase the total energy output by more than the simple increase in B. This is because all of the energy from A that can be diverted into the output by the arrangement has already been diverted. There is no more that can be added to the output from A to bring the output energy level up to 2B. Therefore, there is a limit to the amount of amplification that will occur, and that limit is set by the constant level A.

13. Unlike the amplifiers of the prior art, namely those of U.S. Pat. No. 5,093,802, this amplifier does not have an output waveform riding on a constant, but has a complete waveform that can be amplitude-modulated at 100%, because 2B goes to zero when B goes to zero.

14. Because separate interference images are produced by separate frequencies, simultaneous independent operations can be accomplished by frequency multiplexing. That is, when matching frequencies are provided within the power and controlling beam sets, each frequency operates as if it were physically separate within individual devices. This includes all of the functions, including the phase-bistable devices.

One of the objects of the present invention is to provide an interference-based amplifier that does not have the constant output bias of the amplifier of the prior art.

Another object of the present invention is to provide a bi-phase amplifier that favors one of two phases in its output.

Another object of the present invention is to provide an amplifier with output phase-modulated logic functions, including the AND and the multi-input OR.

A further object of the present invention is to provide a phase-bistable arrangement.

Another object of the present invention is to provide a level detector.

Another object of the present invention is to provide an oscillator which can be synchronized.

A further object of the present invention is to provide an interference-based amplifier for performing all of the above functions which is capable of frequency-multiplexed operation.

The foregoing objects and benefits as well as further objects and benefits of the present invention will become clearer through an examination of the drawings, description of the drawings, description of the preferred embodiment, and claims which follow.

Please note that the energy beam angles, sizes and proportions are exaggerated so as to provide for clarity of understanding.

DESCRIPTION OF THE PREFERRED EMBODIMENT

The descriptions and the drawings have certain conventions and definitions in common. The term "phase" always refers to the relative phases of the wave-type energy used, which determines the pattern of interference that will be produced at any given instant. "Phase" never refers to wave-form modulation; that is, whether it is on or off.

Dotted lines (in the drawings, not in the graphs) and full black arrows refer to beam set positions where the beam at that particular instant happens to be off. Outlined arrows indicate that the beam set is on. Cross-hatching indicates destructive interference.

The drawings depict states where full beam sets are completely on or completely off to give the reader a sense of the full range of possible conditions and how each component interrelates with others during the various states. However, in most operations the signals are neither completely on nor completely off. Except as described, the basic dual-phase amplifier is an analog device.

Phases are measured at positions relative to the interference images produced and the locations of CI and DI relative to the image component separators. For example, in FIG. 1, inputs (A) and (B) are in phase when CI is produced at location (23) and DI at (24). The output, whether measured at location (29) or location (31), changes phases as measured at a single location. While it is only when a portion of the output, such as a feedback signal, is actually combined with one of the inputs that the optics need to be adjusted to produce the proper phase relationships at each position, it is easier to talk about relative phases if we adjust our measuring points so that the signals being measured are compared to that of power beam set (A). Thus, when we talk about changing the phase of (B) which is directly relative to (A), it makes sense to relate that change to changes in the output and feedback signals.

In actual practice, the present invention will work even though actual phases are approximate and/or average phases of a beam set. In the pure form, and for the sake of discussion, when a beam set is "out of phase," it is 180 degrees out of phase. However, actual working devices are seldom so accurate as to produce precise relationships. In actual apparatus, the optics must be able to implement the basic principles of the present invention sufficiently to ensure that the apparatus fulfills the purpose for which it is intended.

Optical arrangements can be quite complex. A simple hole in a mask includes many actual locations, and the energy which goes through the hole interrelates with the rays going through these many points. Holograms (not shown), which are another convenient way of implementing the present invention, take advantage of that fact in the production of images. That is why this disclosure uses the term "beam sets" rather than just "beams." A beam set consists of at least one beam, but most often many beams or rays that operate in unison. When a beam set is said to be "on," all of the many beams that make up the set are on. When portions of the energy at any particular location are modulated differently, they are considered to be of different beam sets.

Interference is produced by superposition of the various beams and beam sets. The various optical elements needed to accomplish superposition are well known in the art. While such optics are needed in working implementations of the present invention, picturing them would just make the drawings more difficult to understand. For that reason, only the essential components of the present invention are shown, as they explain the relationships between the various beams and how they work in harmony to produce those qualities that are unique to this invention. Such optics include that which is needed to produce superpositioning of beam sets (A) and (B) onto image component separator (25), and between (25) and the second separator (30) such as at position (99). However, in many applications, especially where the components are quite small, the simple orienting and positioning of the beam sets and parts of the separators is sufficient to produce superposition both with and without the use of diffraction.

Interference is an amplitude-dependent phenomenon. Therefore, the term "level" relates to the amplitude. However, a beam set may have many points in its cross-sectional area, as is evident by the use of the term "at least one location," which implies that there may be a number of like locations operating in unison.

Time is also involved. No matter how short the period of observation, some time elapses during such observations because we are dealing with modulation waveforms that must of necessity be related to the speed, wavelength, and other factors pertinent to the particular energy form being used. Together they bring into play the amplitude, area, and time period which produces an energy "level."

The combination of a number of beam sets, each with an energy level, produces an energy sum. However, the way that energy sum is produced is directly proportional to the composite amplitude and is, therefore, related in terms of amplitude.

Figure 1:
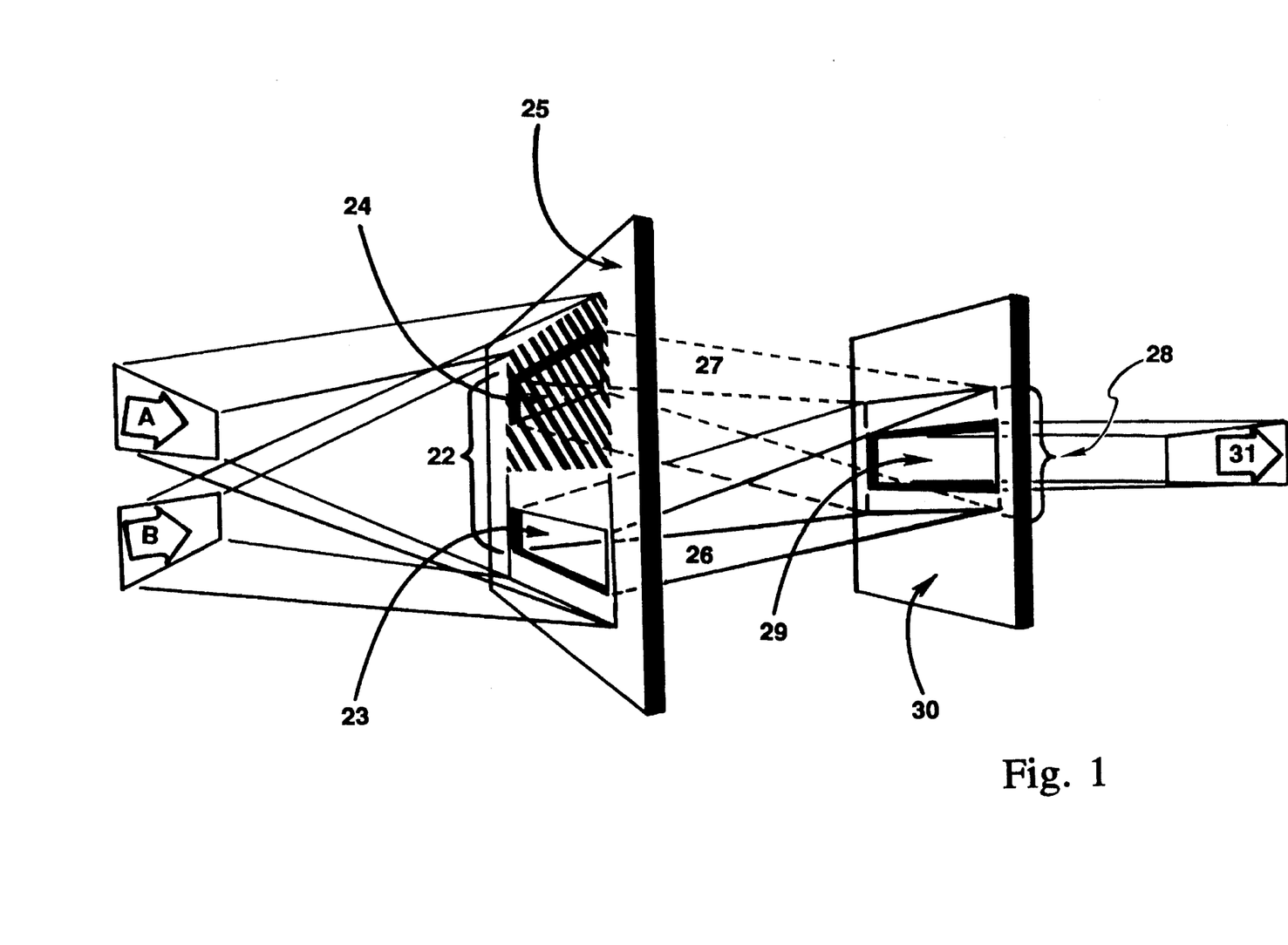
FIG. 1 is a perspective view showing construction of a simple dual-phase amplifier of the present invention.

FIG. 1 is a perspective view of a simple dual-phase amplifier of the present invention. The means and method of amplification comprises the following steps:

1. Providing a power beam set (A) having at least one beam of energy of at least one wavelength maintained at a substantially constant level;

2. Providing a controlling beam set group having a first beam set (B) which has at least one beam of energy of said at least one wavelength, modulated with information to be amplified, said controlling beam set group having an energy sum;

3. Superimposing said power beam set (A) and said controlling beam set group (B) to produce a first interference image (22) having constructive interference at at least one first location (23) and destructive interference at at least one second location (24) when said energy sum from (B) is in phase with said power beam set (A), and destructive interference at said at least one first location (23) and constructive interference at said at least one second location (24)

when said energy sum is 180 degrees out of phase with said power beam set (A);

4. Separating energy from said at least one first location (23) to provide a first intermediate beam set (26);

5. Separating energy from said at least one second location (24) to provide a second intermediate beam set (27);

6. Superimposing said intermediate beam sets (26) and (27) to produce a second interference image (28) having destructive interference at least one third location (29) when said intermediate beam sets are on and said power beam set (A) is greater than said energy sum from (B), and 7. Separating energy from said at least one third location (29) to provide at least one output (31).

The output (31) includes energy from both the (A) and (B) beam sets proportional to (B), at a first phase when (B) is in phase with (A), at a second phase when (B) is 180 degrees out of phase with (A), and at a reduced level at other phase differences, thereby providing a dual-phase amplifier.

Multi-frequency operation within a single device can be accomplished by providing multiple-wavelength energy for all of the inputs. When the various inputs are frequency-multiplexed, each wavelength will function separately from the others just as if there were a separate device for each wavelength. For most frequencies, completely separate images are produced that can be separated as a group by the image component separator. However, some wavelengths do interact with each other, so that the frequencies used in multiplexing must be carefully selected to provide complete separation of function. For wavelengths that do interact with each other, the present invention can be used to transfer information from one wavelength to another.

Figure 2A:
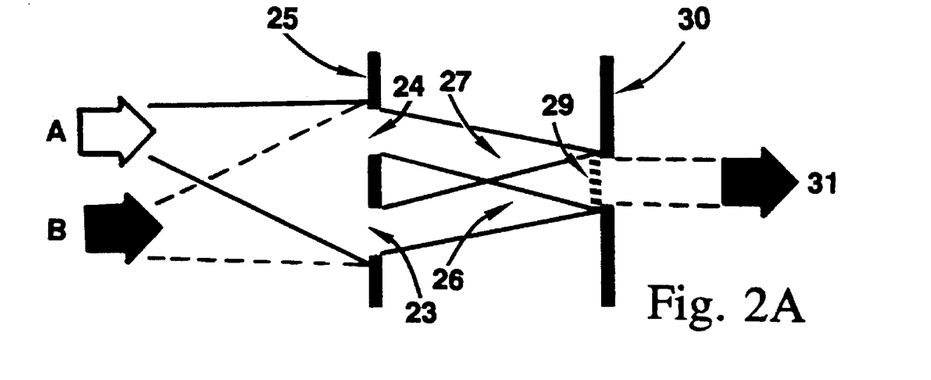
FIGS. 2A, 2B and 2C depict three states of a dual-phase amplifier of the present invention.
Figure 2B:
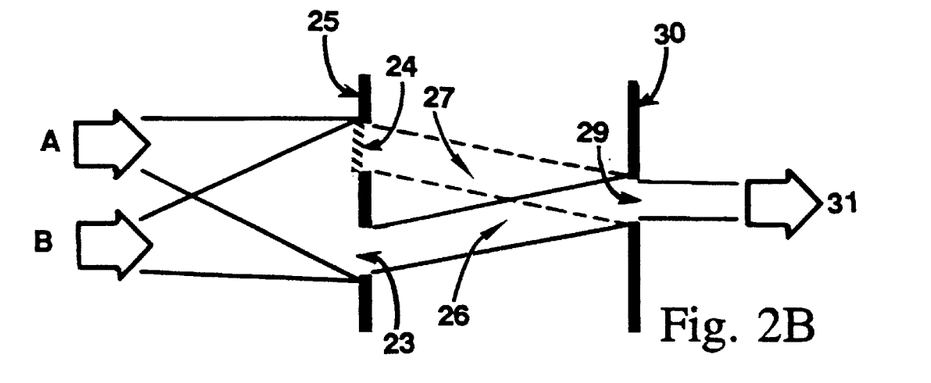
Figure 2C:
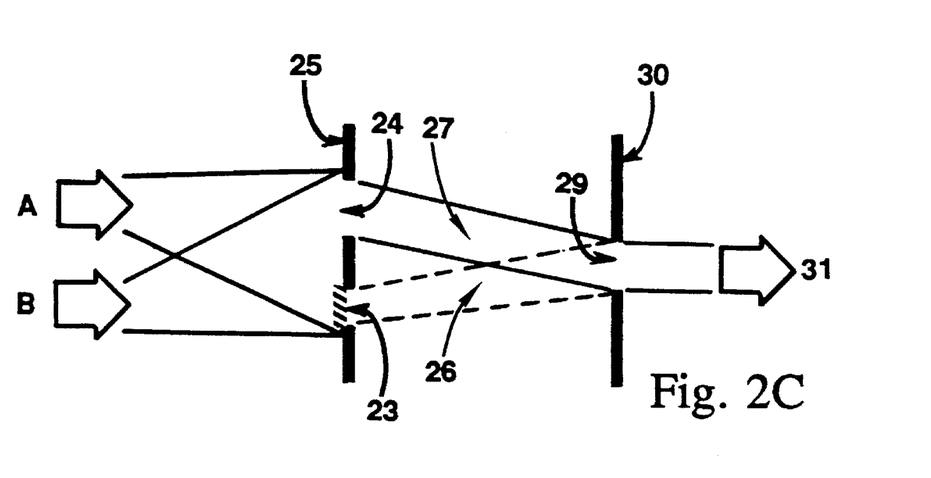

FIGS. 2A, 2B, and 2C depict three specific states of the basic dual-phase amplifier. Cross-sections of the image component separators (25) and (30) are shown.

In the first state (FIG. 2A), the power beam set (A) is on at a substantially constant level. The controlling beam set group (B) is off, as indicated by the dotted lines and the black arrow next to controlling beam set group (B).

In this state, the energy at locations (23) and (24) and, as a result, the intermediate beam sets (26) and (27), have equal amplitudes, but are of opposite phase. This is because (B) is off, so the first interference image is spread evenly over the openings at locations (23) and (24). However, because of the optical arrangement of beam sets (A) and (B) and locations (23) and (24), the energy at location (23) is 180 degrees out of phase with the energy at location (24).

Beam sets (26) and (27) are combined, with any convenient optical arrangement, so that they are superimposed at at least one location (29). Because they are 180 degrees out of phase to start with and arrive at location (29) with this same phase relationship, DI occurs as shown by the cross-hatch. As a result, the output (31) is off, as shown by the dotted lines and black arrow at output (31).

FIG. 2B depicts the case when (A)=(B) and (A) and (B) are in phase. In this case, interference occurs so that the DI area is at location (24) and CI is at location (23). This causes beam set (27) to be off, as indicated by the dotted lines, while beam set (26) is on. No interference occurs at location (29), so the energy in beam set (26) passes through into the output (31) having a first phase because of the optical position of location (23) relative to beam set (A). The optical elements used in the present invention are so arranged and positioned as to locate the CI and DI areas as outlined above for those various states.

FIG. 2C also depicts the case when (A)=−(B). Here, (B) is 180 degrees out of phase with (A). Now the DI and CI areas have exchanged positions from the configuration shown in FIG. 2B. DI occurs at location (23) and CI at location (24). The energy from beam set (27) passes through the hole at location (29) into the output (31). Under these conditions, output (31) has a second phase 180 degrees out of phase with the first phase. This is because the optical location of location (24) is out of phase with location (23) in FIG. 2B.

It should be noted (although it is not shown here) that if (B) is on by itself, the energy at locations (23) and (24) is in phase, and CI occurs at location (29). This is because of the positioning of controlling beam set group (B) relative to power beam set (A) and the first interference image. To produce CI at location (23) or (24), as described for FIGS. 2B and 2C, energy from controlling beam set group (B) must arrive in phase at both positions.

Figure 3:
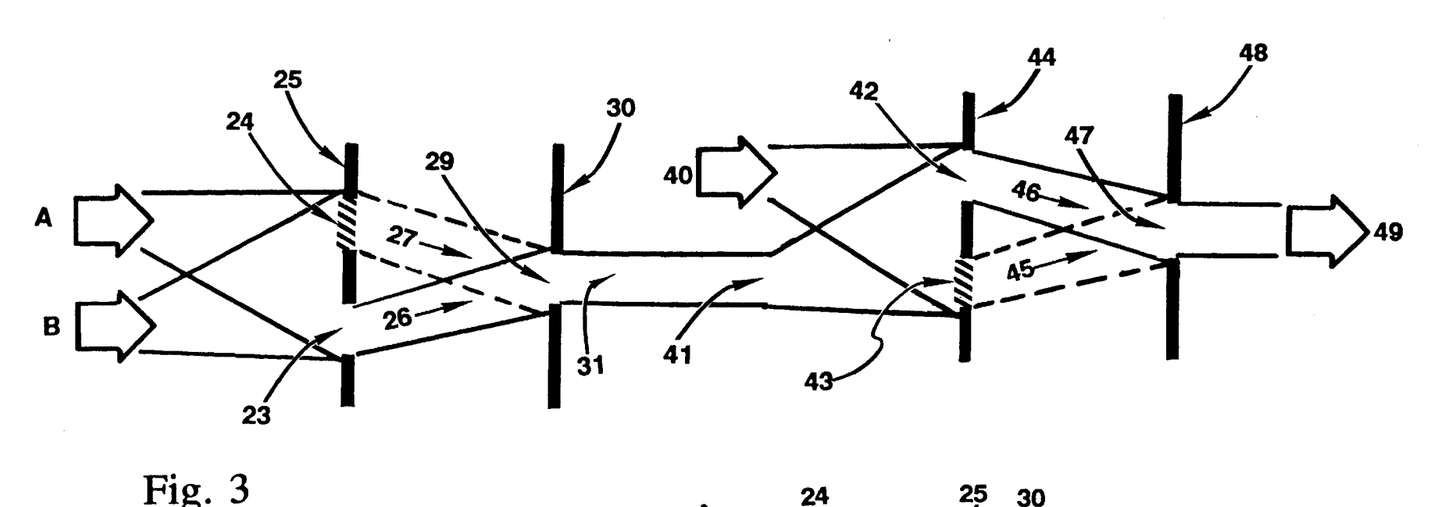
FIG. 3 shows two dual-phase amplifiers cascaded to provide greater amplification.

Often it is desirable to provide more amplification than can be provided by a single amplifier. FIG. 3 depicts two amplifiers in cascade series. The first amplifier operates exactly as described above. The second amplifier has power supplied on its power beam set (40), which is greater than the power beam set (A) of the first amplifier. The modulated input (41) comes directly from output (31) of the first amplifier. Its first interference image forms CI and DI areas at locations (42) and (43). Its intermediate beam sets are separated using its first image component separator (44). The intermediate beams are combined at location (47), and the second interference image is separated by image component separator (48), producing output (49).

The second amplifier is much like the first one, the primary difference being that the power supplied to beam set (40) is able to be up to double the level of (A), so that the output at (49) is able to be four times that of the original input (B).

In addition to the means and method of the amplifier outlined above, these additional steps are used in cascading multiple amplifiers:

providing a plurality of said amplifiers in a cascade series;

cascading said at least one output (31) of each said amplifier into said controlling beam set group (41) of the next said amplifier in said cascade series, and providing at least one large beam set (40), greater than said second beam set of the first said amplifier (B) in said cascade series, wherein said at least one large beam set (40) is used as said power beam set of another said amplifier in said cascade series, thereby providing a cascaded amplifier by controlling said at least one large beam set (40) by a smaller beam set (B) by diverting energy from said at least one large beam set (40) through said cascade series and into said at least one output of the last said amplifier of said cascade series (49) in response to said smaller beam set (B).

Figure 4:
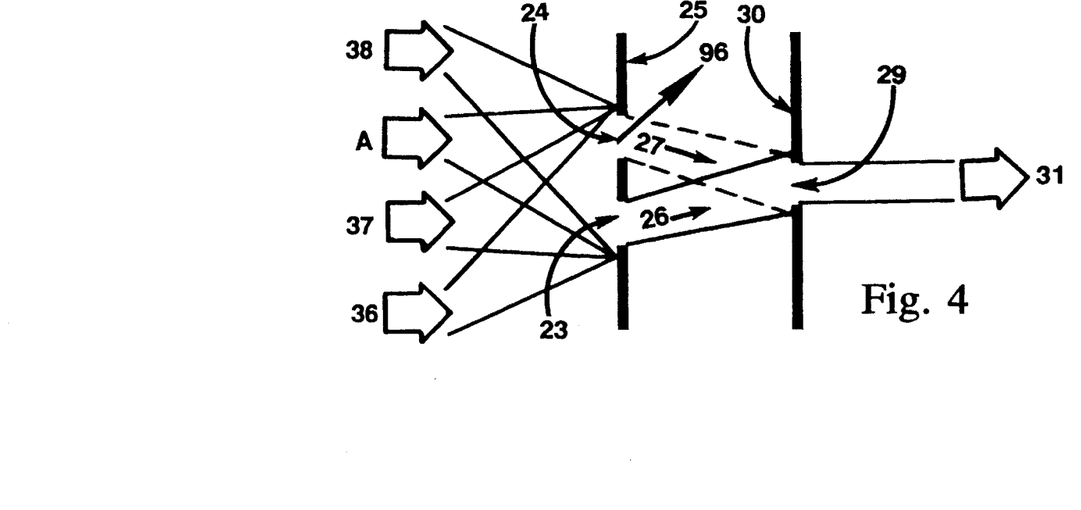
FIG. 4 shows construction details of a dual-phase amplifier having multiple inputs.

FIG. 4 shows a plurality of input beam sets (36), (37), & (38). These inputs produce an energy sum when superimposed at locations (23) and (24). That sum behaves the same as the single beam set (B) does in the previous illustrations. In this way, additional independent inputs can be provided. These beam sets can also be combined outside of the amplifier, with the sum being directed into the amplifier as the controlling beam set group (B).

In addition to the means and method of the amplifier outlined above, these additional steps are used:

providing at least one additional beam set to said controlling beam set group, having at least one beam of energy of said at least one wavelength, thereby providing multiple modulated inputs to said amplifier.

Figure 5:
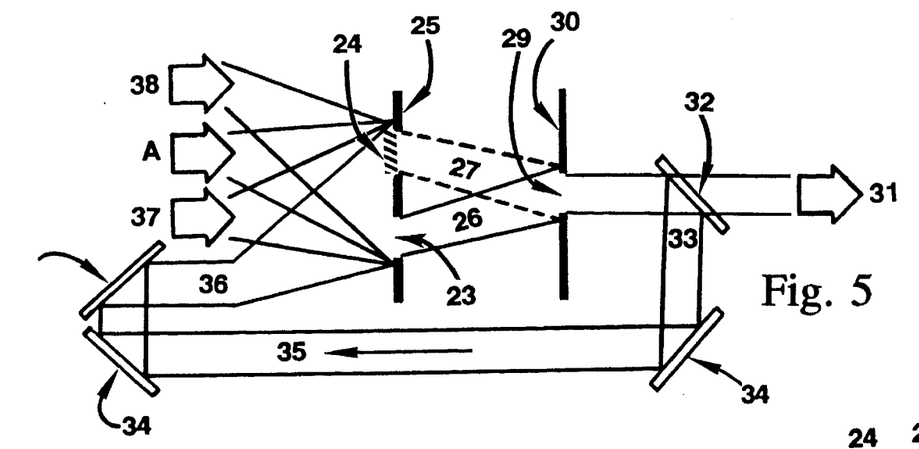
FIGS. 5 & 6 illustrate two states of a bistable dual-phase amplifier.
Figure 6:
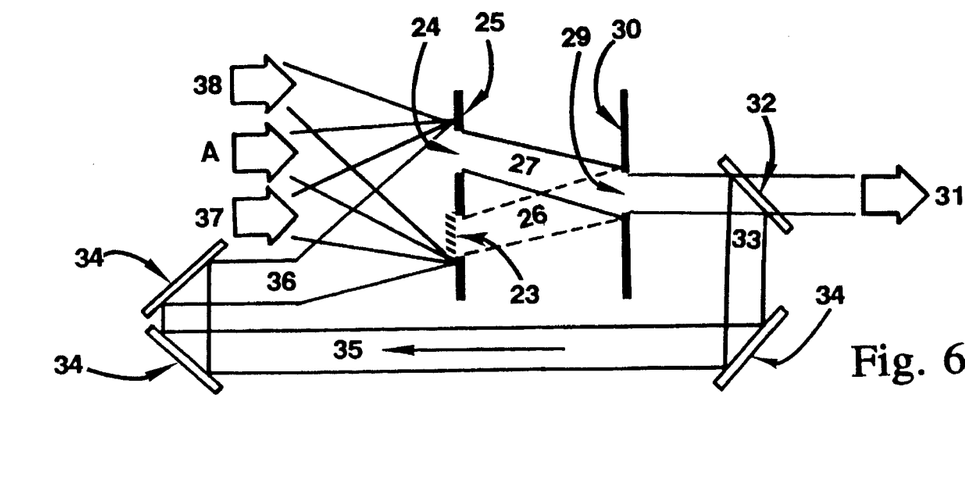

FIGS. 5 and 6 depict a phase-bistable arrangement that can be pulsed into either the FIG. 5 state or the FIG. 6 state.

Here, a partially reflecting mirror (32) supplies a feedback signal (33) along a feedback path (35) to one of the modulated inputs (36) and mirrors (34). This feedback signal holds output (31) on.

A set pulse is provided by pulsing one of the modulated inputs (37) so as to produce the First phase at output (31) and in feedback signal (35), which causes output (31) to be maintained at the first phase. FIG. 5 depicts this first bistable state where DI occurs at location (24) and CI at location (23), which turns beam set (26) on to produce the first phase at location (29) and output (31).

A reset pulse is provided by pulsing one of the modulated inputs (38) so as to produce and hold the second phase at output (31) and feedback signal (35), which maintains output (31) at the second phase. FIG. 6 depicts this state. DI occurs at location (23) and CI at location (24), turning beam set (27) on, which produces the second phase at location (28) and output (31).

The result is a phase-bistable device which maintains output (31) at a first phase following the set pulse and at a second phase following the reset pulse.

In addition to the means and method of the multiple-input amplifier outlined above, these additional steps are used:

providing a feedback signal (35) by directing a portion (33) of said at least one output (31) along a feedback path (35) to supply energy to one of said modulated inputs (36), to hold said at least one output (31) on;

providing a set pulse by pulsing at least one of said modulated inputs (37) or (38) so as to produce said first phase at said at least one output (31) and said feedback signal (35) which maintains said at least one output (31) at said first phase, and providing a reset pulse by pulsing at least one of said modulated inputs (37) or (38) so as to produce said second phase at said at least one output (31) and said feedback signal (35), which maintains said at least one output (31) at said second phase, thereby providing a phase-bistable device by maintaining said at least one output (31) at said first phase following said set pulse and at said second phase following said reset pulse.

Because interference occurs between waves of the same frequency, interference images of different frequencies are able to function independently of one another. As a result, the present invention is able to operate using multiple wavelengths simultaneously within a single optical arrangement.

Frequency-multiplexed operation is accomplished by providing the power beam set (A) with multiple wavelengths. The set and reset pulses at beam sets (37) and (38) are provided at each of the individual wavelengths. Each of the individual wavelengths will behave as described above, independently of the others. Thus, a single bistable device of the present invention is able to simultaneously store multiple bits, with one bit for each wavelength used.

Figure 7:
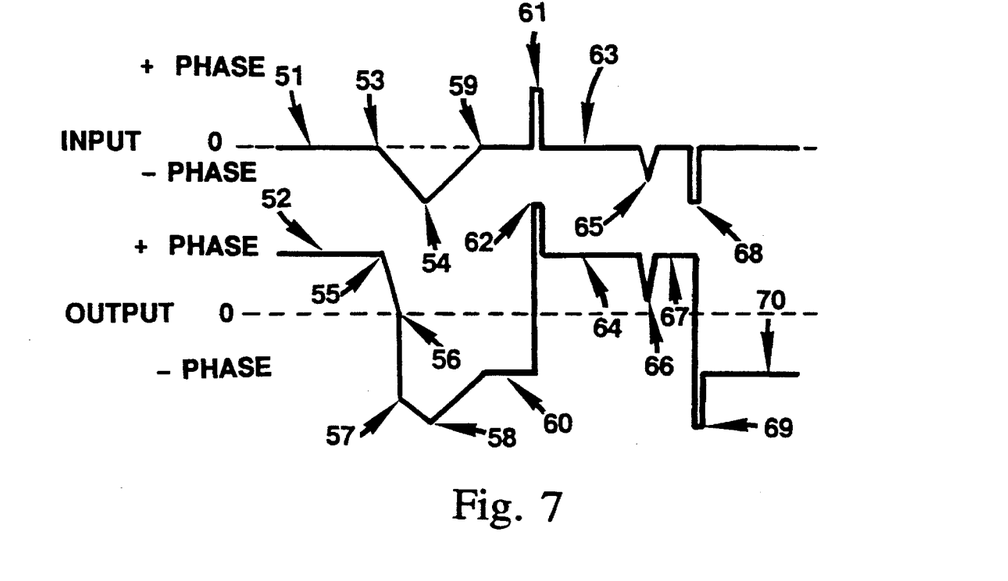
FIG. 7 is a graph showing bistable waveforms.

The present invention can also function as a level detector by providing set and/or reset pulses at various levels. FIG. 7 is an amplitude graph showing several input pulses and the outputs that result. The dotted lines indicate zero amplitude. Positions above the dotted line are of one phase, and positions below the line are of the opposite phase. The amplitude increases positively above the zero line and negatively below it. A single input is illustrated for both set and reset by providing opposite phase pulses; however, separate inputs can also be used.

Initially, the set/reset input is at zero amplitude (51). The output amplitude (52) is one of the bistable states, because the amplitude of the feedback signal is algebraically positive at this time.

A negative phase input pulse increases in amplitude from position (53) to (54). As this pulse increases, the amplitude of the feedback is reduced because it is out of phase with the new input pulse, so the two counter-balance each other with degenerative feedback. The combination of increasing input and decreasing feedback continues to reduce the output (55) until the output becomes zero at (56).

This is the crossover threshold at which the bistable device toggles over to the other phase. As the input continues to increase toward (54), the feedback signal (35) crosses the threshold (56) and switches phases from (55). Now the input pulse and the feedback signal are in phase. Thus, rather than counter-balancing each other, they reinforce each other. This regenerative feedback causes a sudden increase in the feedback signal and the output from (56) to (57) as the feedback signal regenerates itself, assisted by the input pulse.

Further increases in the input amplitude are amplified to point (58) when the input pulse reaches its maximum at (54).

The declining input pulse from (54) to (59) causes a reduction in the output amplitude from (58) to (60). However, because of the feedback signal, the output remains on at the second phase at level (60).

The reset signal, whether it is input on the same beam set as the set pulse or a separate one, comes in out of phase with the set pulse. Now a short reset pulse (61) resets the bistable output. All of the events described from (55) to (60) occur here also, only in the shorter time frame shown by the output pulse (62). After the reset pulse (61) the input returns to zero (63), while the output remains at the feedback-controlled level (64), which is out of phase with level (60) of the other bistable state. Together these set and reset pulses illustrate how the present invention operates as a phase-bistable device.

What happens, though, if the input pulse does not have enough amplitude to override the effect of the feedback signal? Such a pulse is shown at (65). The inverted output pulse (66) is insufficient to turn off the feedback signal and cause it to change phases. When the pulse is complete, the bistable arrangement returns to level (67), which is the same as (64), having the same phase as before.

Only when the input pulse (68) is large enough to overcome the feedback and force it to change phases (69), to toggle, does it establish the new feedback phase (70), and along with it the new bistable output.

This illustrates the level detection ability of the present invention. Once the phase is set, a series of reset pulses or signals of various levels can be input. Only when the total input reaches the crossover threshold will the output phase change.

The next question is, what if one of the set or reset beams is held on all the time as a bias to the energy sum of the modulated inputs? In that case, the bias establishes the initial output phase. The modulated input or inputs must override the bias, at which point the threshold is reached, and the output toggles to the opposite phase. When the modulated input(s) fall below the threshold, the bias causes the output to return to that initial phase.

Figure 8:
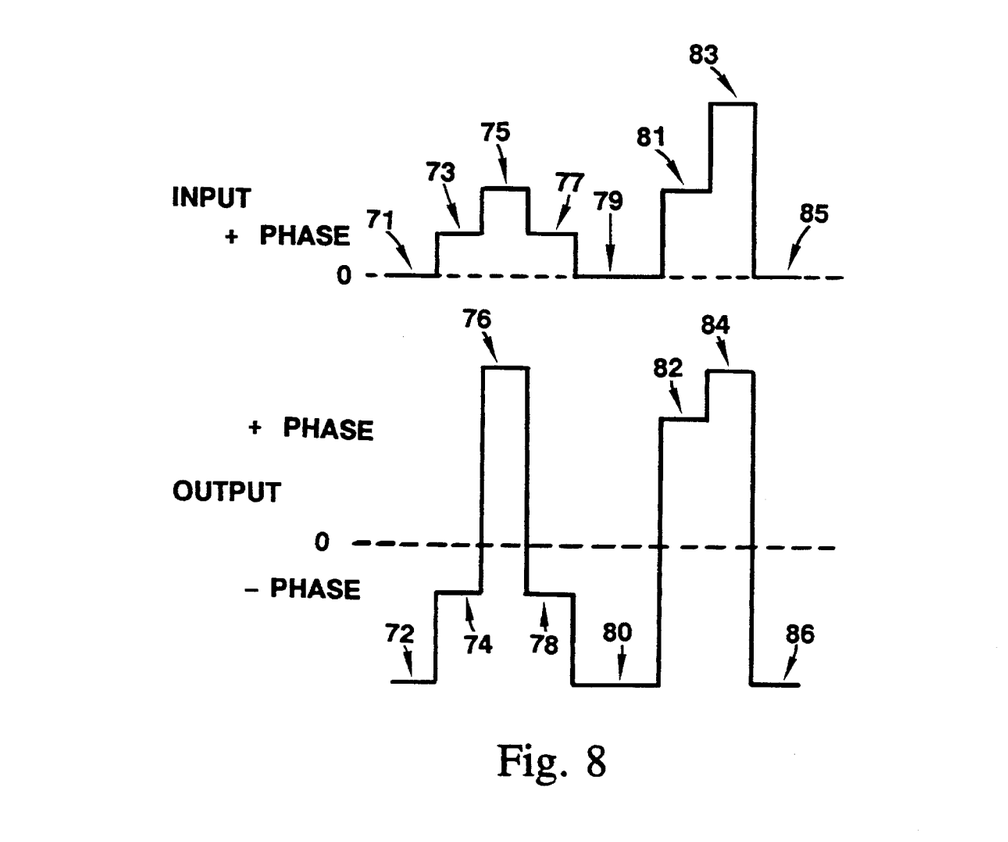
FIG. 8 is a graph showing AND and OR waveforms.

FIG. 8 is a graph of the input and output where the input beam set used for reset is kept on all the time. The graph labeled (INPUT) is of the energy sum of all of the other modulated inputs. With an energy sum of zero (71), the constant reset bias, in conjunction with the feedback signal, holds the output at the amplitude and phase (72).

The modulated inputs are all out of phase with the now constant reset input. When one of them comes on (73), the output is reduced (74), but its level is insufficient to cross the threshold and cause the arrangement to toggle.

At (75), two of the modulated inputs have come on. Their sum is sufficient to cause the output to toggle to (76). While a similar waveform would result from providing inputs such as these to the plain amplifier of the present invention, the feedback signal enhances the output by its toggle action, which makes the output easier to work with in succeeding stages.

When that second input goes off at (77), reducing the output to level (78), the balancing effect of the constant reset bias drives the output past the threshold, forcing it to toggle back to its original phase. As a result, the level of the sum of the modulated inputs is detected. When both of the modulated inputs are off, the output reverts to the same level and phase (80) caused by the constant bias. As a result, the output will toggle only when the sum of all of the modulated inputs is sufficient to override the constant reset bias, regardless of how many modulated inputs there are. That is, the level of the sum is detected by phase toggling.

In addition to the means and method of the multiple-input bistable arrangement outlined above, these additional steps are used:

providing a bias beam set by supplying at least one of said modulated inputs (38) with a substantially constant level which causes said at least one output (31) to have said first phase when the remainder of said modulated inputs (36) and (37) are off, thereby providing level detection which outputs said first phase when said energy sum has the same phase as said bias beam set, and outputs said second phase when said energy sum has the phase opposite that of said bias beam set. Different logical functions can be created through selection of the various levels relative to each other. If the modulated inputs have binary levels such that all of them must be on in order to cause the arrangement to toggle, the result is a logical AND. Its function is as just described for positions (71) through (80). The multiple inputs are AND inputs, and the output toggles to the second phase only when all of the AND inputs are on.

In addition to the means and method of the multiple-input level detecting arrangement outlined above, these additional steps are used for producing the multi-input AND function:

modulating said remainder of said modulated inputs (37) and (36) with binary information as logic inputs, said substantially constant level of said bias beam set (38) being such that said at least one output (31) has said first phase when all except one of said logic inputs are on, and said second phase when all of said logic inputs are on, thereby providing a logical AND having a phase-modulated output.

The multi-input OR is produced by selecting input levels such that any one of the binary inputs is sufficient to cause the arrangement to toggle to the second phase. Now the modulated inputs are called "OR" inputs. Continuing in FIG. 8, a single input at (81) is sufficient to cause the output to toggle up to (82). Additional inputs (83) only serve to increase the amplitude of the output at (84), but cannot cause the arrangement to take on some other phase. When all of the OR inputs go off (85), the output again toggles back to its original first phase (86), which is the same as (72).

In addition to the means and method of the multiple-input level detecting arrangement outlined above, these additional steps are used for producing the multi-input OR function:

modulating said remainder of said modulated inputs (36) (37) with binary information as logic inputs, said substantially constant level of said bias beam set (38) being such that said at least one output (31) has said first phase when said logic inputs are all off, and said second phase when at least one of said logic inputs is on, thereby providing a logical OR having a phase-modulated output.

Figure 9:
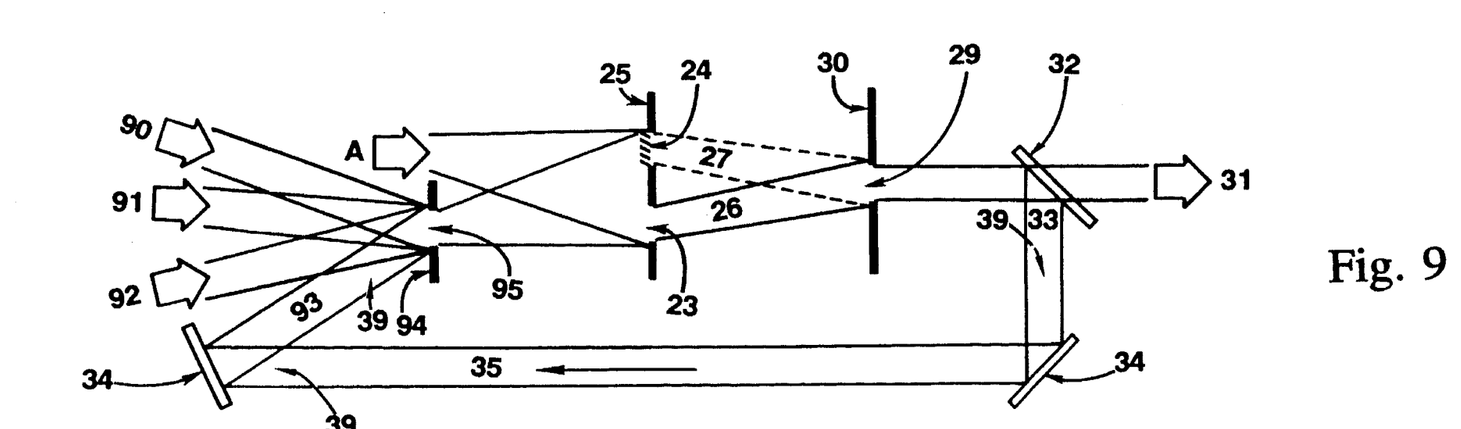
FIGS. 9 & 10 show two states of a bistable dual-phase amplifier with external summation.
Figure 10:
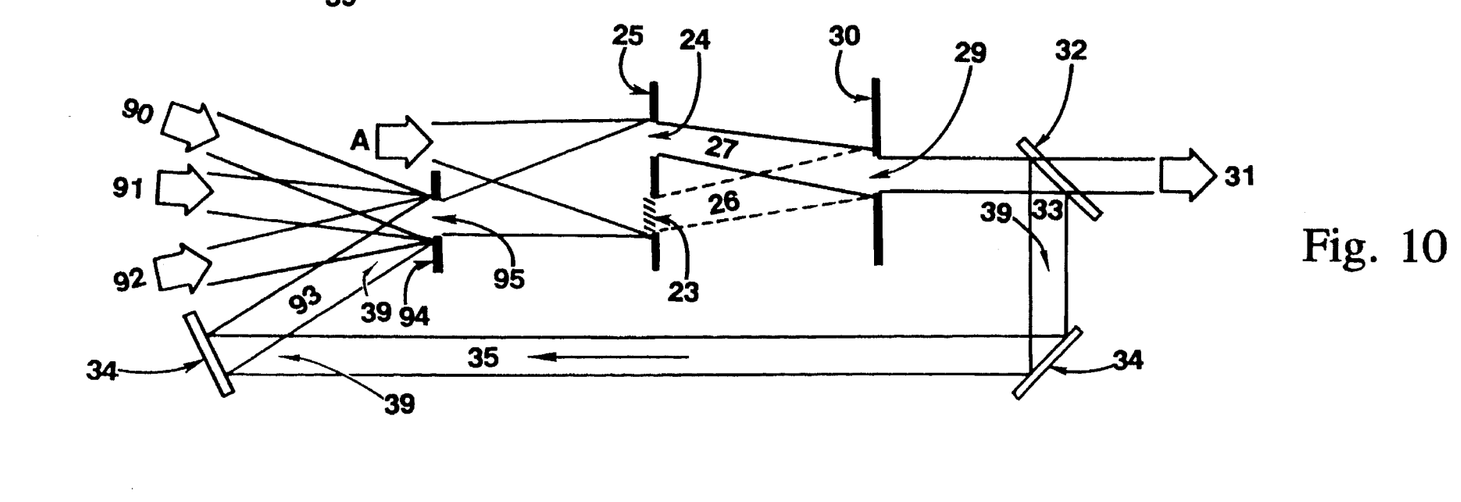

FIGS. 9 and 10 depict the two different states of a phase-binary arrangement of the present invention that have an additional (at least one fourth) location for summing various input signals. The operation is similar to that described above for FIGS. 5 and 6. The modulated inputs are superimposed on a third image component separator (93). Energy from that at least one fourth location is separated to provide input (94) to the amplifier (same as (B) in FIG. 1, as compared to FIGS. 5 and 6, which have input beam sets that are combined at the position of the first interference image).

The modulated inputs (90), (91), and (92) are combined with the feedback signal (35) to provide feedback input (93), which is routed from location (29) to (33) to (92) via optical elements (32) and (34). Feedback input (93), by itself, maintains the output (29) to (32) and (31) at one of two phases. Just as described with the graphs of FIG. 7, a set pulse on input beam set (90) will set the output to the first phase, and a reset pulse on beam set (91), which is 180 degrees out of phase with beam set (90), will toggle the output to the second phase shown in FIG. 10.

When beam set (90) is held constant, as in FIG. 8, one or more inputs such as beam sets (91) and (92) can be used to produce level detection, the AND, and the OR arrangements. The only difference between FIGS. 5 & 6 and 9 & 10 is that input beam set summing takes place inside the amplifier in the former two, and outside the amplifier in the latter two.

What would happen, though, if the feedback path were long enough to introduce a delay period and included a 180-degree phase shift? In this case, the delay period causes the feedback signal to maintain one of the two phases for the length of the delay, as the output energy passes from location (29) to feedback input (93) in FIGS. 9 and 10, or from location (29) to beam set (36) in FIGS. 5 and 6. The 180-degree phase shift causes the amplifier to toggle at the completion of the delay period.

The result is a phase-toggling oscillator. Output (31) provides a continuous-phase output for each delay period, then toggles to the other phase for a delay period, and continues to shift back and forth.

In addition to the means and method of the multiple-input amplifier outlined above, these additional steps are used to produce phase oscillation:

providing a delayed feedback signal (35) by directing a portion of energy from said at least one output along a delay path (39) to provide a delay period;

directing said delayed feedback signal (35) to supply energy to at least one of said modulated inputs phased so as to cause said at least one output (31) to change phases, such that said at least one output (31) remains at said first phase during said delay period when said delayed feedback signal is in phase with said power beam set (A), and said at least one output remains at said second phase during said delay period when said delayed feedback signal is out of phase with said power beam set (A), thereby producing phase oscillation by successively changing said at least one output to said first phase or said second phase during each delay period.

The oscillator above can be synchronized by supplying a synchronization pulse that establishes one of the two output phases by overriding the feedback signal long enough to establish a new oscillatory pattern. Thus, in addition to the means and method of oscillation outlined above, these additional steps are used to synchronize the phase oscillations:

providing a synchronization pulse to at least one of said modulated inputs to initiate said delay period by causing said at least one output to provide a specific phase during said synchronization pulse, thereby providing synchronized phase oscillation.

Another feature that may be added is an amplitude-modulated output (96) as shown in FIG. 4 that can be produced by taking a portion of the energy from the first interference image that is in phase with either the first locations or the second locations. This amplitude-modulated output is especially useful in the phase shifting arrangements such as the bistable and oscillatory arrangements.

In addition to the bistable means and method outlined above, these additional steps are used to provide an amplitude-modulated output:

separating energy from said first interference image at at least one fourth location, said energy being in phase with energy at either said at least one first location or said at least one second location to provide at least one amplitude-modulated output, thereby providing a bistable device having an amplitude-modulated output.

In review, several important principles are applied in the present invention that are not used in, and therefore distinguish it from, the prior art:

1. The fact that all of the input energy for all of the input beam sets is of either one phase or its opposite phase causes the CI and DI positions to remain at the first and second locations (23) and (24) of FIGS. 5 and 6.

2. The first image component separator (24) blocks energy of other phases because the CI for any other phase does not occur at either location (23) or (24). As a result, the invention favors these two opposite phases.

3. The CI and DI will always be of either one phase or the other (within the range of the band pass which is determined by the exact size and organization of the optics used) because of the physics of interference, so the intermediate beam sets (26) and (27) will be of only one or the other phase.

4. Combining beam sets (26) and (27) at location (29) will always result in a signal of one phase or the other, because the combination of two beams that are either in phase or out of phase by 180 degrees results in the algebraic sum of the two, rather than producing a vector at some other phase.

5. The second image component separator prevents energy which does not meet the phase criteria described in 4 above from entering the output.

6. The synergistic application of the above principles produces a new tool, a dual-phase amplifier with many applications.

7. The introduction of regenerative feedback causes the arrangement to toggle from one phase to the other.

8. The introduction of multiple inputs permits the output phase to be controlled by the sum of all inputs.

9. Holding one input on to establish a predetermined output phase allows the arrangement to detect levels.

10. Selecting the input levels determines the conditions under which toggling will occur. This allows the level detector to be used as a multi-input AND or a multi-input OR.

11. Introducing a time-delayed out-of-phase feedback signal causes the amplifier to oscillate between phases.

12. Taking an output from the first interference image produces an amplitude-modulated output for the oscillator or the bistable device.

13. All of the above functions can be operated in a simultaneous frequency-multiplexed mode, where each frequency used operates independently of the others.

While the foregoing description of the preferred embodiment of the present invention has disclosed specific constructions, means, and methods of accomplishing the present invention, because specific improvements and modifications will become readily apparent to those skilled in the art of computers and optical devices and the like, it is applicant's intent not to be limited by any of the foregoing descriptions, but only by the claims which follow.

What is claimed is:

1. A dual-phase amplifier comprising:

a power beam set means having at least one beam of energy of at least one wavelength, maintained at a substantially constant level;

a controlling beam set group means having a first beam set which has at least one beam of energy of said at least one wavelength, said controlling beam set group means having an energy sum and being positioned and oriented so as to superimpose said controlling beam set group means onto said power beam set means to produce a first interference image having constructive interference at at least one first location and destructive interference at at least one second location when said energy sum is in phase with said power beam set means, and destructive interference at said at least one first location and constructive interference at said at least one second location when said energy sum is 180 degrees out of phase with said power beam set means;

a first image component separator for separating energy from said at least one first location to provide a first intermediate beam set and separating energy from said at least one second location to provide a second intermediate beam set;

superimposing means for superimposing said intermediate beam sets to produce a second interference image having destructive interference at at least one third location when said intermediate beam sets are on and said power beam set means is greater than said energy sum, and a second image component separator for separating energy from said at least one third location to provide at least one output, thereby providing an amplifier with at least one output, having energy from both said power beam set means and said controlling beam set group means proportional to said energy sum, at a first phase when said energy sum is in phase with said power beam set means, at a second phase when said energy sum is 180 degrees out of phase with said power beam set means, and at a reduced level at other phase differences.

2. A method of amplification comprising the steps of:

providing a power beam set having at least one beam of energy of at least one wavelength, maintained at a substantially constant level;

providing a controlling beam set group having a first beam set which has at least one beam of energy of said at least one wavelength, modulated with information to be amplified, said controlling beam set group having an energy sum;

superimposing said power beam set and said controlling beam set group to produce a first interference image having constructive interference at at least one first location and destructive interference at at least one second location when said energy sum is in phase with said power beam set, and destructive interference at said at least one first location and constructive interference at said at least one second location when said energy sum is 180 degrees out of phase with said power beam set;

separating energy from said at least one first location to provide a first intermediate beam set;

separating energy from said at least one second location to provide a second intermediate beam set;

superimposing said intermediate beam sets to produce a second interference image having destructive interference at at least one third location when said intermediate beam sets are on and said power beam set is greater than said energy sum, and separating energy from said at least one third location to provide at least one output, thereby providing an amplifier with at least one output, having energy from both said power beam set and said controlling beam set group proportional to said energy sum, at a first phase when said energy sum is in phase with said power beam set, at a second phase when said energy sum is 180 degrees out of phase with said power beam set, and at a reduced level at other phase differences.

3. The method of claim 2 including:

providing at least one additional beam set to said controlling beam set group, having at least one beam of energy of said at least one wavelength, thereby providing multiple modulated inputs to said amplifier.

4. The method of claim 3 including:

providing a feedback signal by directing a portion of said at least one output along a feedback path to supply energy to one of said modulated inputs to hold said at least one output on;

providing a set pulse by pulsing at least one of said modulated inputs so as to provide said feedback signal with said first phase to maintain said at least one output at said first phase, and providing a reset pulse by pulsing at least one of said modulated inputs so as to provide said feedback signal with said second phase to maintain said at least one output at said second phase, thereby providing a phase bistable method by maintaining said at least one output at said first phase following said set pulse and at said second phase following said reset pulse.

5. The method of claim 4 including:

providing a bias by holding at least one of said modulated inputs on at a substantially constant level, said energy sum being in phase with said bias when said remainder of said modulated inputs are off, causing said at least one output to be at said first phase, and said energy sum being out of phase with said bias when a signal which is out of phase with and exceeds the combination of said bias and said feedback signal is applied to at least one of said remainder of said modulated inputs, causing said at least one output to toggle to said second phase, thereby providing level detection when said at least one output toggles to said second phase, and when said energy sum again has a phase equal to said bias, causing said at least one output to toggle back to said first phase.

6. The method of claim 5 including:

modulating said remainder of said modulated inputs with binary information as logic inputs, said substantially constant level of said bias being such that said at least one output has said first phase when said logic inputs are all off, and said second phase when at least one of said logic inputs is on, thereby providing a logical OR having a phase-modulated output.

7. The method of claim 5 including:

modulating said remainder of said modulated inputs with binary information as logic inputs, said substantially constant level of said bias being such that said at least one output has said first phase when all except one of said logic inputs are on, and said second phase when all of said logic inputs are on, thereby providing a logical AND having a phase-modulated output.

8. The method of claim 2 including:

providing a plurality of said amplifiers in a cascade series;

cascading said at least one output of each said amplifier into said controlling beam set group of the next said amplifier in said cascade series, and providing at least one large beam set, greater than said energy sum of the first said amplifier in said cascade series, wherein said at least one large beam set is used as said power beam set of another said amplifier in said cascade series, thereby providing a cascaded amplifier by controlling said at least one large beam set by a smaller beam set by diverting energy from said at least one large beam through said cascade series and into said at least one output of the last said amplifier of said cascade series in response to said smaller beam set.

9. The method of claim 3 including:

providing a delayed feedback signal by directing a portion of energy from said at least one output along a delay path to provide a delay period;

directing said delayed feedback signal to supply energy to at least one of said modulated inputs phased so as to cause said at least one output to change phases, such that said at least one output remains at said first phase during said delay period when said delayed feedback signal is in phase with said power beam set, and said at least one output remains at said second phase during said delay period when said delayed feedback signal is out of phase with said power beam set, thereby producing phase oscillation by successively changing said at least one output to said first phase or said second phase during each said delay period.

10. The method of claim 9 including:

providing a synchronization pulse to at least one of said modulated inputs to initiate said delay period by causing said at least one output to provide a specific phase during said synchronization pulse, thereby providing synchronized phase oscillation.

11. The method of claim 4 including:

separating energy from said first interference image at at least one fourth location, said energy being in phase with energy at either said at least one first location or said at least one second location to provide at least one amplitude-modulated output, thereby providing a bistable method having an amplitude-modulated output.

12. The dual phase amplifier of claim 1 wherein;

said controlling beam set group means has at least one additional beam set which has at least one beam of energy of said at least one wavelength, thereby providing multiple modulated inputs to said amplifier.

13. The dual phase amplifier of claim 12 including:

a feedback path for directing a portion of said at least one output to one of said modulated inputs to hold said at least one output on such that pulsing one of said modulated inputs to provide said feedback signal with said first phase maintains said at least one output at said first phase, and pulsing at least one of said modulated inputs to provide said feedback signal with said second phase maintains said at least one output at said second phase, thereby providing a phase-bistable means.

14. The dual phase amplifier of claim 13 including:

a bias means for holding at least one of said modulated inputs on at a substantially constant level, said energy sum being in phase with said bias when said remainder of said modulated inputs are off, causing said at least one output to be at said first phase, and said energy sum being out of phase with said bias when a signal which is out of phase with and exceeds the combination of said bias and said feedback signal is applied to at least one of said remainder of said modulated inputs, causing said at least one output to toggle to said second phase, thereby providing level detection when said at least one output toggles to said second phase, and when said energy sum again has a phase equal to said bias, causing said at least one output to toggle back to said first phase.

15. The dual phase amplifier of claim 14 wherein:

said remainder of said modulated inputs are logic inputs, and said substantially constant level of said bias is such that said at least one output has said first phase when said logic inputs are all off, and said second phase when at least one of said logic inputs is on, thereby providing a logical OR having a phase-modulated output.

16. The dual phase amplifier of claim 14 wherein:

said remainder of said modulated inputs are logic inputs, and said substantially constant level of said bias is such that said at least one output has said first phase when all except one of said logic inputs are on, and said second phase when all of said logic inputs are on, thereby providing a logical AND having a phase-modulated output.

17. The dual phase amplifier of claim 1 including:

at least one additional said amplifier to provide a plurality of said amplifiers in cascade series, said plurality of amplifiers including at least a first said amplifier and a second said amplifier, said at least one output of said first amplifier being fed into said controlling beam set group means of said second amplifier in said cascade series, and said power beam set means of said second amplifier being greater than said energy sum of said first amplifier, thereby providing a cascaded amplifier by controlling at least one larger beam set with a smaller beam set by diverting energy from said at least one larger beam set into said at least one output of the last said amplifier of said cascade series in response to said smaller beam set.

18. The dual phase amplifier of claim 12 including:

a feedback means, including a delay path to provide a delay period, for providing a delayed feedback signal by directing a portion of energy from said at least one output to at least one of said modulated inputs phased so as to cause said at least one output to change phases at the end of each said delay period, said at least one output remaining at said first phase during said delay period when said delayed feedback signal is in phase with said power beam set means, and said at least one output remaining at said second phase during said delay period when said delayed feedback signal is out of phase with said power beam set means, thereby producing phase oscillation by successively changing said at least one output to said first phase or said second phase during each said delay period.

19. The dual phase amplifier of claim 18 including:

pulse means for providing a synchronization pulse to at least one of said motivated inputs to initiate said delay period by causing said at least one output to provide a specific phase during said synchronization pulse, thereby providing synchronized phase oscillation.

20. The dual phase amplifier of claim 13 wherein:

said first image component separator includes an amplitude-modulated output, energy at said amplitude-modulated output being in phase with energy at either said at least one first location or said at least one second location, thereby providing a bistable means having an amplitude-modulated output.

* * * * *